Feb. 6, 1940. G. G. HARRINGTON 2,189,030
REAMER
Original Filed Nov. 14, 1938
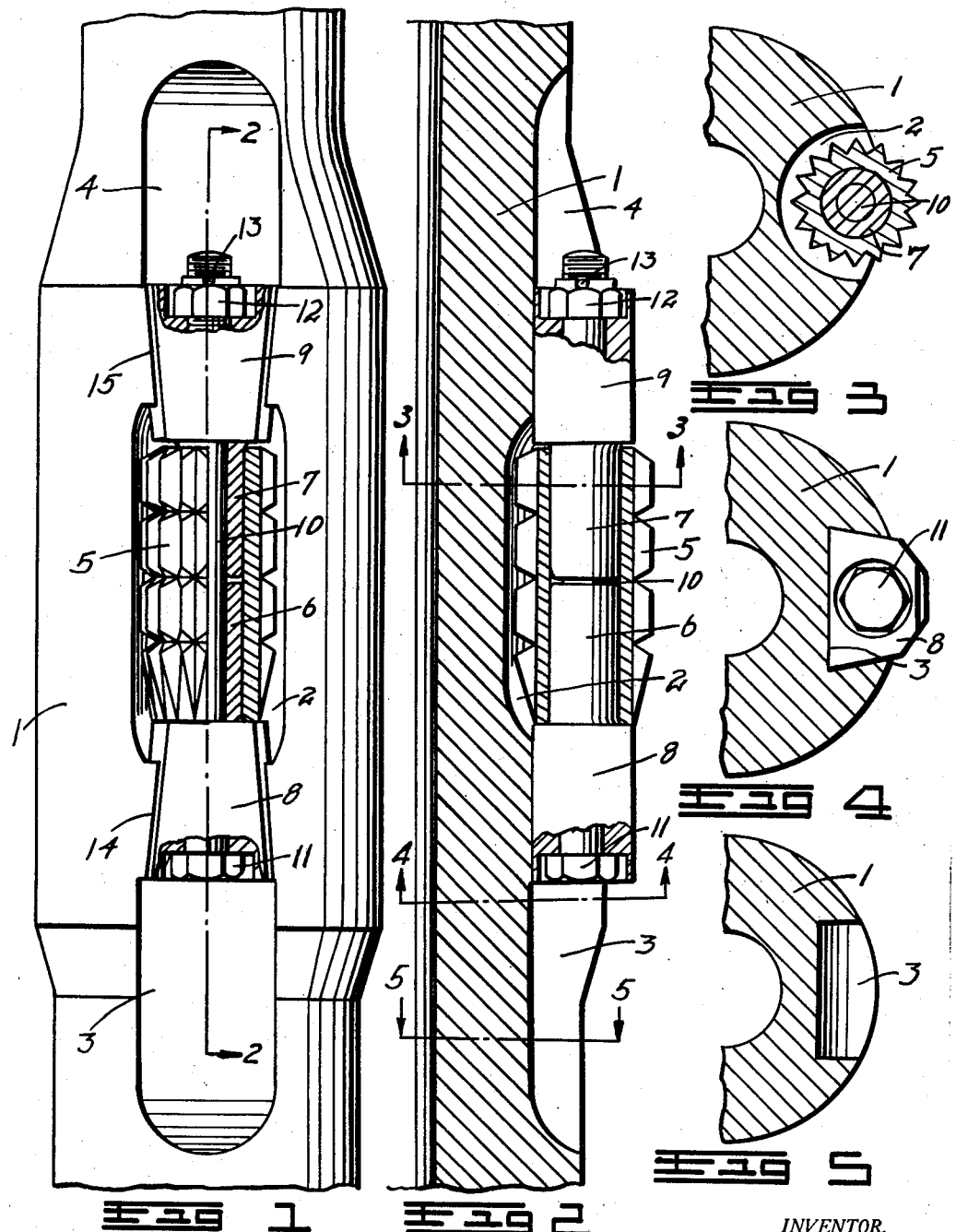
INVENTOR.
G. G. HARRINGTON.
BY
ATTORNEYS Patented Feb. 6, 1940

2,189,030

UNITED STATES PATENT OFFICE 2,189,030

REAMER

George G. Harrington, Houston, Tex., assignor to Reed Roller Bit Company, Houston, Tex., a corporation of Texas Application November 14, 1938, Serial No. 240,401
Renewed August 9, 1939

12 Claims. (Cl. 255—73)

This invention relates to reamers for use in connection with the drilling of wells. It has for its general object the provision of a structure whereby a reamer cutter of the roller type may be firmly and rigidly yet replaceably mounted within a cutter recess in a reamer body.

In mounting reamer cutters within their recesses, it is necessary that they be mounted as firmly as possible and that there be no possibility of play between any of the parts constituting the mounting during the operation of the reamer.

It is, therefore, an object of this invention to provide a structure for mounting a reamer cutter in a recess in the side of the reamer body in such a manner as to give the greatest possible degree of rigidity to the mounting, prevent any play or lost motion between the parts of the mounting during operation, and at the same time utilize the smallest possible number of parts and eliminate any parts which might easily be broken or distorted.

It is a further object to provide a mounting in which the mounting parts are constantly urged into tighter locking engagement with the head.

It is a further object of this invention to provide a structure in which the parts are not welded or similarly joined together and in which no welding is employed in mounting the cutter in the reamer body.

It is a further object to provide a structure which may be readily removed and replaced by unskilled labor without necessity for any factory operations or for any fine adjustments and without necessity for any special tools.

Other objects and advantages will become apparent from the following description, taken in connection with the accompanying drawing, it being understood that the same are by way of illustration and example only.

In the drawing:

Fig. 1 is a side elevation of a reamer body constructed in accordance with this invention showing the reamer cutters in place therein.

Fig. 2 is a vertical cross section through one wall of the reamer body illustrated in Fig. 1 and through one of the cutters mounted therein, the same being taken along the line 2—2 of Fig. 1.

Fig. 3 is a partial horizontal cross section taken along the line 3—3 of Fig. 2.

Fig. 4 is a partial horizontal cross section taken along the line 4—4 of Fig. 2.

Fig. 5 is a partial horizontal cross section taken along the line 5—5 of Fig. 2.

In accordance with this invention, a reamer body 1 is formed with a major recess 2 and with a pair of auxiliary or minor recesses 3 and 4, respectively, at opposite ends of and in communication with the major recess. Disposed within the major recess is the reamer cutter 5, the same being rotatably mounted upon a pair of bushings 6 and 7, extending into the hollow interior of the cutter 5 from the opposite ends thereof. These bushings 6 and 7 terminate adjacent each other and adjacent the central portion of the reamer 5 and are formed integral with the blocks 8 and 9, respectively. These blocks 8 and 9 are of larger cross section than the bushings 7 and are formed with their lateral outer surfaces on a double taper. That is, each of these blocks tapers toward the cutter in a direction longitudinal with respect to the body of the reamer, and each of these blocks also tapers in a direction away from the center of the body, this in effect forming a tapered dovetail. The portions of the auxiliary recesses adjacent the major recess 2 are likewise tapered toward each other and away from the center of the reamer body. It will readily be seen that when these blocks 8 and 9 are forced toward each other, they will be wedged against the body 1 and will be held against longitudinal movement with respect to the body. For the purposes of drawing these two blocks together, there is provided a bolt 10 which extends through the two blocks and through the bushings 6 and 7, having a head 11 on one end thereof for engagement with the block 8 and having a nut 12 threaded onto the opposite end thereof for engagement with the block 9. The nut 12 may be prevented from backing off the bolt 10 by any suitable means such as a cotter key 13.

The fit between the double tapered portions 14 and 15 of the auxiliary recesses 3 and 4, respectively, and the double tapered sides of the blocks 8 and 9 is so arranged that these blocks will tightly fit within said recesses when they have moved toward each other a sufficient distance to provide the proper clearance between their inner ends to rotatably mount the cutter 5 without excessive longitudinal play. The auxiliary recesses 3 and 4, at positions remote from the major recess 2, are provided with portions of greater width than the tapered portions 14 and 15 so that the blocks 8 and 9 may be placed in these recesses in a radial direction and then moved longitudinally into the tapered portions of the recesses.

It will be seen from the foregoing that cutters secured to reamer bodies in the manner just described may readily be dismounted by removing the nut 12 and the bolt 10, slipping the blocks 8 and 9 out of their tapered recesses, and taking the cutter 5 out of its major recess. A substitute cutter can then be put in the place of the one removed and the one removed either discarded or repaired, as the case may be. In placing a cutter in position it is merely necessary to hold the cutter in the major recess, place the blocks 8 and 9 in the remote portions of the auxiliary recesses 3 and 4 and move them toward each other, guiding the bushings 6 and 7 into the opposite ends of the cutter 5 and then passing the bolt 10 through one of the blocks 8, through the bushings 6 and 7, through the other block 9, and secure it in place with the nut 12. Tightening of the nut 12 will force both blocks 8 and 9 into tight wedging engagement with the tapered portions 14 and 15 of the auxiliary recesses and will firmly secure the cutter in proper position with respect to the body.

It will be seen from the foregoing that a means has been provided whereby a reamer cutter may be removably mounted in a reamer body in such a manner that jolts, jars and vibrations incident to the operation of the reamer will not be able to dislocate or loosen the reamer cutter from its position on the body. Instead, the means for holding the mounting in proper position which in the embodiment illustrated is the bolt 10, will serve at all times to constantly urge the blocks by which the cutter is mounted into tighter engagement with the head. It will be appreciated also that the bolt itself as well as the other parts possess some degree of resiliency and that upon being tightened it is to a small extent also stretched. If and when due to one cause or another the blocks move toward each other in their auxiliary recesses, this stretch in the bolt will serve to follow them up and continue to hold them in their tightened relation with respect to the auxiliary recesses. This obviously will in all cases prevent the blocks from becoming loosened in their recesses and will thus provide a permanently tight though readily detachable mounting for the reamer cutters.

Having described my invention, I claim:

1. In a reamer construction, a reamer body having a major recess in its outer surface and a smaller auxiliary recess at each end of said major recess, each of said auxiliary recesses tapering toward a smaller dimension in a direction toward said major recess and in a direction outwardly from the center of said reamer body, a correspondingly tapered block in each of said auxiliary recesses having bearing parts extending into said major recess, a reamer cutter in said major recess surrounding said bearing parts, a bolt extending through said blocks and through said bearing parts, and a nut on said bolt adapted to be tightened to draw said blocks tightly within the tapered portions of said auxiliary recesses and into proper position to rotatably mount said cutter in a major recess.

2. In a reamer construction, a reamer body having a major recess in its outer surface and a smaller auxiliary recess at each end of said major recess, each of said auxiliary recesses tapering toward a smaller dimension in a direction toward said major recess and in a direction outwardly from the center of said reamer body, a correspondingly tapered block in each of said auxiliary recesses having bearing parts extending into said major recess, a reamer cutter in said major recess surrounding said bearing parts, and means extending through said blocks and said bearing portions and adapted to draw said blocks toward each other and into tight engagement with the tapered portions of said auxiliary recesses.

3. In a reamer construction, a reamer body having a major recess in its outer surface and a smaller auxiliary recess at each end of said major recess, each of said auxiliary recesses tapering toward a smaller dimension in a direction toward said major recess and in a direction outwardly from the center of said reamer body, a correspondingly tapered block in each of said auxiliary recesses having bearing parts extending into said major recess, a reamer cutter in said major recess surrounding said bearing parts, and means for drawing said blocks toward each other and into tight wedging engagement with the tapered portions of said auxiliary recesses.

4. In a reamer construction, a reamer body having a major recess in its outer surface, and a smaller auxiliary recess at each end of said major recess, said auxiliary recesses tapering toward smaller dimensions in opposite directions with respect to said major recess and toward a smaller dimension in a direction outwardly from the center of said reamer body, a correspondingly tapering block in each of said auxiliary recesses, and means for moving said blocks in opposite directions with respect to said major recess to cause said blocks to wedgingly engage the tapered portions of said auxiliary recesses, and means carried by said blocks and extending into said major recess to form bearing portions and a cutter rotatably mounted in said major recess on said bearing portions.

5. In a reamer construction, a reamer body having a major recess in its outer surface and a smaller auxiliary recess at each end of said major recess, each of said auxiliary recesses tapering in one longitudinal direction toward a smaller dimension, a correspondingly tapered block in each of said auxiliary recesses, a reamer pin having its ends carried by said blocks respectively and extending through said major recess, a reamer cutter rotatably carried about said pin within said major recess, and means for forcing said blocks tightly into both of said auxiliary recesses.

6. In a reamer construction, a reamer body having a major recess in its outer surface and a smaller auxiliary recess at each end of said major recess, each of said auxiliary recesses being of dovetail cross section and tapering in one longitudinal direction, said recesses being in opposing relation to each other, a correspondingly tapered block in each of said auxiliary recesses having bearing parts extending into said recess, a reamer cutter in said major recess surrounding said bearing parts, and means for moving said blocks with respect to each other into tight wedging engagement with the tapered portions of said auxiliary recesses.

7. In a reamer construction, a reamer body having a major recess in its outer surface and a smaller auxiliary recess at each end of said major recess, each of said auxiliary recesses tapering toward a smaller dimension in one longitudinal direction and being positioned in opposing relation to each other, a correspondingly tapered block in each of said auxiliary recesses having bearing parts extending into said major recess, a reamer cutter in said major recess surrounding said bearing parts, and means for moving said blocks with respect to each other and into tight wedging engagement with the tapered portions of said auxiliary recesses.

8. In a reamer construction, a reamer body having a major recess in its outer surface and a smaller auxiliary recess at each end of said major recess, each of said auxiliary recesses tapering toward a smaller dimension in one longitudinal direction, a correspondingly tapered block in each of said auxiliary recesses carrying bearing parts extending into said major recess, a reamer cutter in said major recess surrounding said bearing parts, and means for moving said blocks with respect to said body into tight wedging engagement with the tapered portions of said auxiliary recesses.

9. In a reamer construction, a reamer body having a major recess in its outer surface and a smaller auxiliary recess at each end of said main recess, each of said auxiliary recesses tapering in one longitudinal direction toward a smaller dimension, a correspondingly tapered block in each of said auxiliary recesses, a reamer pin having its ends carried by said blocks respectively, and extending through said major recess, a reamer cutter rotatably mounted about said pin within said major recess, and means for forcing said blocks tightly into both of said auxiliary recesses.

10. In a reamer construction, a reamer body having a major recess in its outer surface and a smaller auxiliary recess at one end of said major recess, said auxiliary recess tapering in width from one end toward the other, a correspondingly tapered block in said auxiliary recess, a bearing part carried by said block and extending into said major recess, a reamer cutter rotatably carried by said bearing part within said major recess, and means for forcing said block tightly into said auxiliary recess.

11. In a reamer construction, a reamer body having a major recess in its outer surface and a smaller auxiliary recess at one end of said major recess, said auxiliary recess tapering in width from one end toward the other, a correspondingly tapered block in said auxiliary recess, a reamer pin having one of its ends carried by said block and extending into said major recess, a reamer cutter rotatably mounted about said pin within said major recess, and means for forcing said block tightly into said auxiliary recess.

12. In a reamer construction, a reamer body having a major recess in its outer surface and a smaller auxiliary recess at one end of said major recess, said auxiliary recess being of dovetail cross section and tapering in one longitudinal direction toward a smaller dimension, a correspondingly shaped block in said auxiliary recess, bearing means projecting from said block into said major recess, a reamer cutter rotatably carried by said bearing means within said major recess, and means for forcing said block tightly into said auxiliary recess.

GEORGE G. HARRINGTON.